United States Patent
Bernasconi et al.

(10) Patent No.: US 10,248,580 B2
(45) Date of Patent: Apr. 2, 2019

(54) METHOD AND CIRCUIT FOR PROTECTING AND VERIFYING ADDRESS DATA

(71) Applicant: STMICROELECTRONICS (ROUSSET) SAS, Rousset (FR)

(72) Inventors: Eric Bernasconi, Vence (FR); Richard O'Connor, Mougins (FR)

(73) Assignee: STMICROELECTRONICS (ROUSSET) SAS, Rousset (FR)

(*) Notice: Subject to any disclaimer, the term of this patent is extended or adjusted under 35 U.S.C. 154(b) by 416 days.

(21) Appl. No.: 15/055,896

(22) Filed: Feb. 29, 2016

(65) Prior Publication Data
US 2017/0010980 A1 Jan. 12, 2017

(30) Foreign Application Priority Data
Jul. 10, 2015 (FR) .................................. 15 56621

(51) Int. Cl.
G06F 12/14 (2006.01)
G06F 3/06 (2006.01)
G06F 13/16 (2006.01)
G06F 13/40 (2006.01)
G06F 13/42 (2006.01)
G06F 11/10 (2006.01)

(52) U.S. Cl.
CPC .......... G06F 12/145 (2013.01); G06F 3/0619 (2013.01); G06F 3/0629 (2013.01); G06F 3/0673 (2013.01); G06F 11/1016 (2013.01); G06F 12/1408 (2013.01); G06F 13/1678 (2013.01); G06F 13/404 (2013.01); G06F 13/4282 (2013.01); G06F 2212/1052 (2013.01)

(58) Field of Classification Search
CPC ...................................................... G06F 12/145
See application file for complete search history.

(56) References Cited

U.S. PATENT DOCUMENTS

| | | | |
|---|---|---|---|
| 5,787,481 A | 7/1998 | Boutaud et al. | |
| 6,363,211 B1* | 3/2002 | Kanota | G06F 3/0614 386/231 |
| 7,433,980 B1* | 10/2008 | Fischaber | G11C 7/1006 365/189.02 |
| 2006/0218332 A1 | 9/2006 | Boudreau | |

(Continued)

FOREIGN PATENT DOCUMENTS

| | | |
|---|---|---|
| CN | 1825296 A | 8/2006 |
| CN | 205692570 U | 11/2016 |

(Continued)

*Primary Examiner* — Farley Abad
(74) *Attorney, Agent, or Firm* — Slater Matsil, LLP (57) ABSTRACT

A circuit is for protecting memory address data. The circuit may include an input data bus configured to receive write data to be written to a memory device, and an address bus configured to receive a corresponding write address. The circuit may also include an output data bus, and an address protection circuit coupled to the input data, address, and output data buses and configured to generate an address protection value based on the corresponding write address, and generate modified write data, on the output data bus. The modified write data includes the write data and the address protection value. The output data bus may have a width greater than a width of the input data bus.

23 Claims, 3 Drawing Sheets

(56) References Cited

U.S. PATENT DOCUMENTS

| | | | |
|---|---|---|---|
| 2008/0022163 A1* | 1/2008 | Tanaka | G06F 11/1068 714/710 |
| 2012/0144277 A1* | 6/2012 | Lee | G06F 11/1004 714/807 |
| 2017/0010980 A1 | 1/2017 | Bernasconi et al. | |

FOREIGN PATENT DOCUMENTS

| | | |
|---|---|---|
| EP | 0674258 A1 | 9/1995 |
| EP | 1873649 A1 | 1/2008 |

* cited by examiner

METHOD AND CIRCUIT FOR PROTECTING AND VERIFYING ADDRESS DATA

RELATED APPLICATION

This application claims the priority benefit of French Patent application number 1556621, filed on Jul. 10, 2015, the contents of which is hereby incorporated by reference in its entirety.

TECHNICAL FIELD

The present disclosure relates to memory interfaces, and in particular to, a memory interface for protecting and verifying address data.

BACKGROUND

When writing to any memory device such as a Dynamic Random Access Memory (DRAM) or Static Random Access Memory (SRAM) device, it is possible for signals to be corrupted, for example, as a result of single event upsets. While memory interfaces often include protection and/or correction mechanism for the data written to and read from the memory, there may be also a problem with address data being corrupted. It may be difficult to detect when the address data has been corrupted, as it results in data being written to or read from an incorrect address. The data stored at the incorrect address may not be corrupted, and thus protection mechanisms concerning the data signal will fail to identify/correct the error.

The corruption of address data on the input/output lines to a memory is likely to be relatively rare. However, for certain applications, such as automobile applications, aviation, and/or space applications, it is desirable to provide extremely reliable memory devices, as human safety may depend on correct operation. It may be helpful to provide a method and device for protecting and verifying address data transmitted over the input/output lines of a memory.

SUMMARY

Generally speaking, a circuit is for protecting memory address data. The circuit may include an input data bus configured to receive write data to be written to a memory device, and an address bus configured to receive a write address. The circuit may also include an output data bus, and an address protection circuit coupled to the input data, address, and output data buses and configured to generate an address protection value based on the write address, and generate modified write data, on the output data bus. The modified write data includes the write data and the address protection value. The output data bus may have a width greater than a width of the input data bus.

DETAILED DESCRIPTION

According to one aspect, there is provided a circuit for protecting memory address data. The circuit may be adapted to receive, on an input data bus, write data to be written to a memory device, and on an address bus, a corresponding write address, to generate an address protection value based on the write address, and to generate modified write data on an output data bus, the modified write data comprising the write data and the address protection value. The width of the output data bus may be larger than the width of the input data bus.

The circuit may be further adapted to generate a data protection value based on the write data, the modified write data further comprising the data protection value. The circuit may further comprise an address generation circuit adapted to generate a modified write address on an output address bus to the memory device. The address generation circuit may be adapted to generate the modified write address by shifting the write address by one bit to the left.

The number of bits N of the write data may be less than the width M of the input data bus, and the address protection value may be generated based on a sub-address corresponding to the position of the N bits of write data within the width of the address bus. The width M of the input data bus may be equal to a multiple P of the number of bits N of the write data, and the circuit may comprise P address encoders each adapted to generate the address protection value based on a corresponding one of the sub-addresses.

According to some embodiments, a protection data generation circuit may be adapted to generate the address protection value by encoding the write address to generate a Y-bit value, where Y is less than the number of bits of the write address. The circuit may further comprise an address range filtering circuit adapted to determine whether the write address is in an address range to be protected, the address protection value generated only if the address is in the address range to be protected.

The circuit may further comprise a bypass path for providing the write data directly to the write data output bus if the write address is not in an address range to be protected, the bypass path comprising a bridge circuit adapted to convert N bits of write data into at least N+Y bits of write data.

Another aspect is directed to a circuit for verifying memory address data. The circuit may be adapted to receive, on an address bus, a read address, and to generate a reference address protection value based on the read address. The circuit may be adapted to receive, on a read data input bus from a memory device, read data and an address protection value read from the memory device, and to verify the memory address data by comparing the address protection value read from the memory device with the reference address protection value.

The number of bits N of the read data may be less than the width M of a read data portion of the read data input bus, and the reference address protection value may be generated based on a sub-address corresponding to the position of the N bits of read data within the width of the read data portion of the read data input bus. The width M of the read data portion of the read data input bus may be equal to a multiple P of the number of bits N of the read data, and the circuit may include P address encoders each adapted to generate the address protection value based on a corresponding one of the sub-addresses.

According to another aspect, an address protection/verification circuit comprises the above circuit for protecting memory address data and the above circuit for verifying memory address data.

Another aspect is directed to a method of protecting memory address data. The method may include receiving, on an input data bus, write data to be written to a memory device and, on an address bus, a corresponding write address, generating an address protection value based on the write address, and generating modified write data on an output data bus. The modified write data may comprise the write data and the address protection value, where the width of the output data bus is larger than the width of the input data bus.

According to yet another aspect, a method is for verifying memory address data. The method may include receiving, on an address bus, a read address, generating a reference address protection value based on the read address, receiving, on a read data input bus from a memory device, read data and an address protection value read from the memory device, and verifying the memory address data by comparing the address protection value read from the memory device with the reference address protection value.

Figure 1:
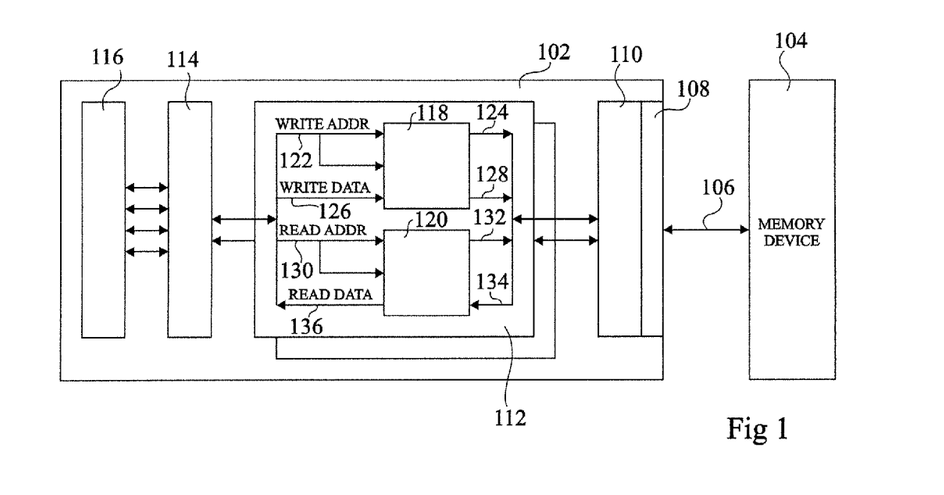
FIG. 1 is a schematic diagram of an integrated circuit in communication with a memory device, according to the present disclosure.

FIG. 1 shows an integrated circuit 102 and a memory device 104. The memory device 104 is, for example, a DRAM or SRAM device, or other type of addressable memory device. The memory device 104 is, for example, positioned off-chip, meaning that the input/output lines 106 between the integrated circuit 102 and the memory device 104 are in the form of wires and/or conductive tracks. In alternative embodiments, the memory device 104 could be integrated on-chip, as part of the integrated circuit 102.

The integrated circuit 102 comprises circuitry for interfacing with the memory device 104, and, for example, comprises a physical interface layer 108, coupled to the input/output lines 106, a memory controller 110 coupled to the physical interface layer 108, an address protection/verification circuit 112, a system on chip (SoC) interconnect 114, and a processing device 116. The processing device 116 is, for example, a central processing unit (CPU), a graphics processing unit (GPU), or a direct memory access (DMA) unit, etc.

The processing device 116 is, for example, coupled to the memory controller 110 via the SoC interconnect 114, and via the address protection/verification circuit 112. However, in alternative embodiments, the address protection/verification circuit 112 could be incorporated into the memory controller 110 or into the processing device 116. An advantage of placing the circuit 112 between the processing device 116 and the memory controller 110 is that it is possible to use existing processing devices 116 and memory controllers 110, and the circuit 112 can be implemented in such a way that it is transparent to the existing circuitry.

The circuit 112, for example, comprises an address protection circuit 118, and an address verification circuit 120. The address protection circuit 118 receives a write address (WRITE ADDR) on an input bus 122, the write address, for example, being provided to the address protection circuit on two paths. One of the paths is used to generate, on an output bus 124, a modified address to be supplied to the memory device 104. The modified address, for example, has an increased address range. The other path is, for example, used to generate an address protection value based on the write address. The circuit 118 also receives write data (WRITE DATA) on an input bus 126, and provides, on an output bus 128, the data to be written to the modified address in the memory device 104, which comprises the write data and the address protection value.

The address verification circuit 120 receives a read address (READ ADDR) on an input bus 130, the read address, for example, being provided to the address verification circuit 120 on two paths. One of the paths is used to generate, on an output bus 132, a modified read address to be supplied to the memory device 104. The modified address, for example, has an increased address range. The other path is, for example, used to generate a reference address protection value based on the read address. As a result of the read operation, the circuit 120 receives, on an input bus 134 from the memory device 104, the read data, which includes the address protection value that was written at the same time as the data. The circuit 120, for example, compares the address protection value read from the memory device 104 with the reference address protection value generated based on the read address. The circuit 120 outputs read data (READ DATA) on an output bus 136, but this data is, for example, only outputted if the address protection value matches the reference address protection value. As an alternative, the read data may always be outputted, but a separate error signal (not illustrated in FIG. 1) may be asserted at an output of the address verification circuit 120 to indicate that the address data was corrupted. Indeed, the address protection value read from the memory device will not match the reference address protection value if the write address was corrupted and the data was written to the read address in error, or if the read address was corrupted, and an unintended address was therefore read.

Each address protection/verification circuit 112 may implement slicing such that the full width of the data bus is processed in smaller widths of N bits. For example, assuming that the data bus has a width of M bits, the data bus is, for example, processed in P slices of N bits, where M=P×N. Furthermore, as represented in FIG. 1, in some embodiments, there may be a plurality of address protection/verification circuits 112 operating in parallel, each circuit 112 being associated with a separate port of the memory controller 110.

Figure 2:
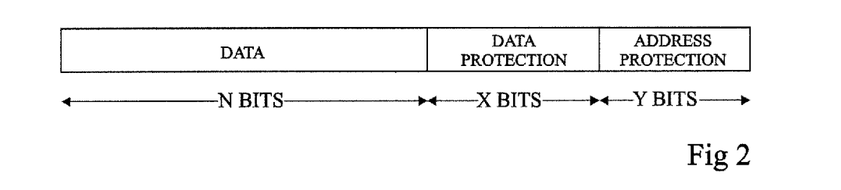
FIG. 2 is a schematic diagram of modified write data, according to the present disclosure.

FIG. 2 represents an example of the contents of the write data provided on the bus 128 to be written to a memory address of the memory device 104. The same contents will also be read during a read operation. As illustrated, the write data comprises N bits of system data (DATA), which corresponds to the data supplied by the processing device 116 to be written to a memory address. N is, for example, an integer equal to at least 4, and is, for example, a power of 2 equal to 8 or more. In some embodiments, N is equal to the width M of the data input bus 126 of the circuit 118 of FIG. 1. However, in alternative embodiments, a more precise address verification can advantageously be achieved by making N less than the bus width. For example, in some embodiments, the width of the bus 126 is 64 bits, and N is equal to 8. More generally, N is, for example, equal to M/P, where P is an integer equal to 2 or more.

The write data also, for example, comprises X bits forming a data protection value (DATA PROTECTION) and Y bits forming the address protection value (ADDRESS PROTECTION). The data protection value is optional, as in some embodiments data protection is not implemented, or it is implemented by a different circuit, such as by the memory controller 110.

In some embodiments, X+Y=N, such that N+X+Y=2N, where X is equal to zero or to a positive integer, and Y is equal to at least 1. The particular encoding scheme used to generate the address protection value is, for example, selected based on the available bits. An address protection value of a single bit is, for example, a simple parity check value. Y, for example, has an upper limit of Q; where Q is the number of bits of the address corresponding to the N-bit data. In such a case, the address is simply copied, without reducing the number of bits by encoding. In one embodiment, N is equal to 8, X is equal to 5, and Y is equal to 3.

Figure 3:
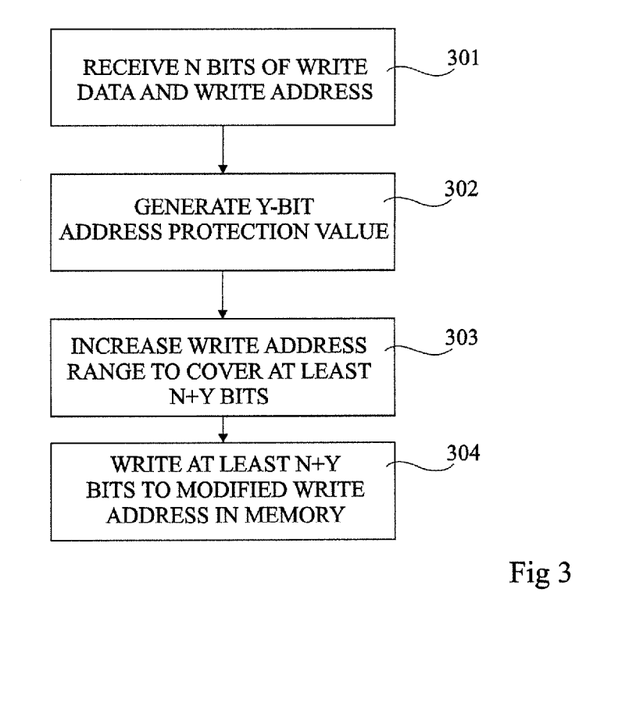
FIG. 3 is a flowchart illustrating a method of protecting address data, according to the present disclosure.

FIG. 3 is a flow diagram showing implemented by the circuit 118, a method of protecting address data according to an example embodiment. In an operation 301, the circuit 118 receives N bits of data to be written to a memory device, and a corresponding write address.

In a subsequent operation 302, the circuit 118 generates an address protection value of Y bits, based on the write address. In some embodiments, a derivative of the write address is generated, and the address protection value is generated based on this derivative. For example, if the write data bus 126 is of M bits, where M is equal to P times N, then P sub-addresses are, for example, generated based on the write address, and a different address protection value is generated for each of the sub-address. The address protection value is, for example, any value permitting the accuracy of address data to be verified with at least a certain level of certainty. For example, the address protection value could comprise one or more parity check values, an error correction code such as a hamming code, a cyclic redundancy check code (CRC), or even a copy of some or all of the address bits.

In a subsequent operation 303, the write address range is, for example, increased to cover data blocks of at least N+Y bits. Indeed, the address provided on the address bus 122 is, for example, based on the blocks of N bits of system data. Thus, the size of the address space is, for example, increased by the circuit 118 such that the address protection value can be stored in addition to the system data. For example, in the case that the width of the data bus is doubled, and assuming that the least significant bit (lsb) of the address corresponds to a byte, doubling the address will result in the address covering two bytes rather than a single byte. In alternative embodiments, it would however be possible not to modify the address, and instead for each address to cover a word that is twice as wide as each word supplied on the data bus. In an operation 304, the N+Y bits are written to the modified write address in the memory device.

Figure 4:
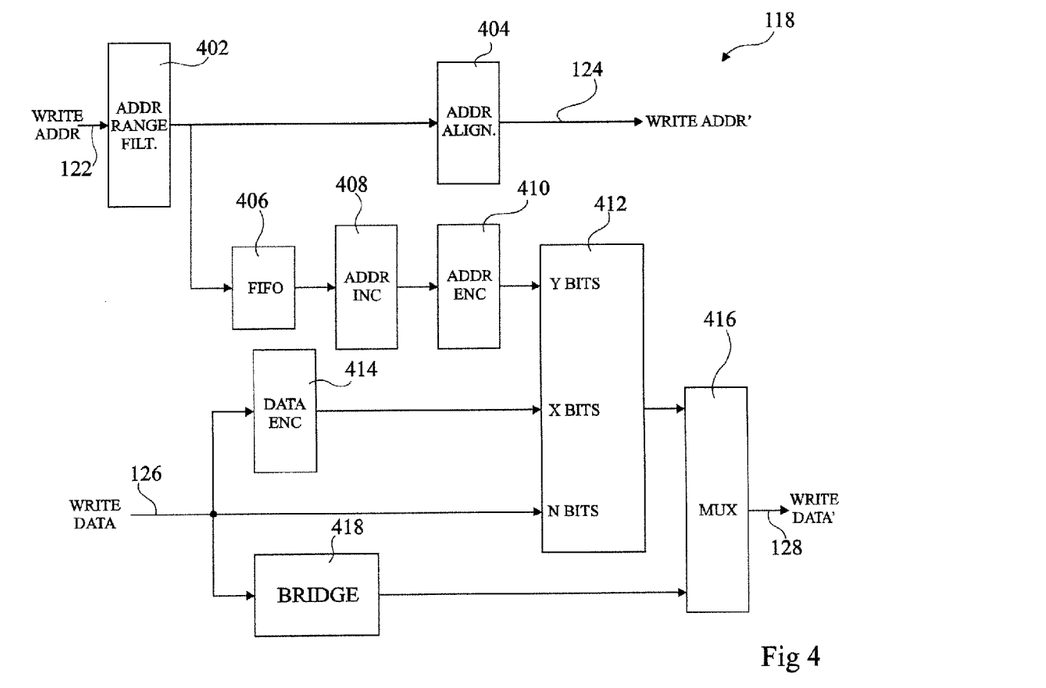
FIG. 4 is a schematic diagram of a write address protection circuit of FIG. 1 in more detail.

FIG. 4 shows the write address protection circuit 118 of FIG. 1. The input address bus (WRITE ADDR) 122 is, for example, coupled to an address range filter (ADDR RANGE FILT) 402, which, for example, permits the address protection/verification to be provided to only certain address ranges in the memory device. For example, the memory device could be subdivided into a first portion for which address protection/verification is to be provided, and a further portion for which no address protection/verification is to be provided.

The output of the circuit 402 is coupled to an address alignment circuit (ADDR ALIGN) 404, which, for example, increases the write address range to allow the address protection value, and optionally a data protection value, to be inserted. As a simple example, the memory device may have an addressable range (expressed in hexadecimal) from 0×00 to 0×FF, but the processing device 116 may only see an addressable range of half of the total, for example, the range 0×00 to 0×7F. Thus, each of these addresses is, for example, translated into two adjacent physical addresses in the memory device, the address 0×01 becoming 0×02, the address 0×02 becoming 0×04, and so on and so forth, with the address 0×7F becoming 0×FE. These translations correspond to a simple left shift by one bit of each address. The modified write address WRITE ADDR' is provided on the output address bus 124.

The write address from the address filter 402 is also, for example, provided to a first-in first-out (FIFO) buffer 406, which, for example, stores one or more of the addresses, and provides them upon request to an address incrementer (ADDR INC) 408, which is, for example, used to generate, based on the write address, the addresses to be accessed during the write operation. The address incrementer 408 is, for example, adapted to increment the address by increments corresponding to the width of the write data bus 122. For example, if the write data bus 122 is 8 bytes wide, and the least significant bit of the address designates one byte, with each new block of write data on the write data bus 126 the address incrementer 408 is, for example, adapted to increment the address by increments of 8.

The output of the address incrementer 408 is provided to an address encoder (ADDR ENC) 410, which, for example, generates a Y-bit address protection value based on the address value, and provides the Y-bit value to a concatenation circuit 412. The address encoder 410, for example, generates the address protection value based on the address of the corresponding N bit data value. In the case that the data bus width M is equal to N, the address encoder 410 will simply generate the address protection value based on the address provided by the address incrementer 408. If however M is equal to P×N, where P is an integer of 2 or more, the address encoder, for example, generates P different protection values, one for each block of N bits across the width of the data bus.

For example, in the case that the data bus width equals 2N, the address encoder 408, for example, generates a first address protection value for the first N bits of the write data based on the address provided by the address incrementer 408, and then generates a second address protection value for the second N bits of the write data based on the address provided by the address incrementer 408 incremented by 1. The concatenation circuit 412 also receives the N bits of system data provided on the input write data bus 126. In the example of FIG. 4, the bus 126 is also coupled to a data encoder circuit 414 (DATA ENC), which, for example, encodes the data to generate an X-bit data protection value, also provided to the concatenation circuit 412.

The circuit 412 concatenates the N, X and Y-bit values to form the write data to be written to the memory device. The output of the concatenation circuit 412 is, for example, coupled to one input of a multiplexer 416, which provides, at its output, write data (WRITE DATA') on the data bus 128. An additional input of the multiplexer 416 is, for example, coupled to receive the write data from the input bus 126, without the addition of an address protection value or data protection value. For example, the write data is provided via a bridge circuit (BRIDGE) 418, which converts N bits of write data provided on a single memory access cycle into 2N bits of write data over two memory access cycles. For example, on a first cycle, the N bits of write data are stored by the bridge 418, and on a subsequent cycle, when a further N bits have been received, the 2N bits are outputted on the bus 128. The multiplexer 416 is, for example, adapted to select the path with the bridge 418 if the write operation concerns an address range which is not to have added address and data protection.

In some embodiments, the address protection/verification circuit 112 implements slicing such that different portions of the data bus width are processed in parallel. In such a case, the address encoder 410, concatenation circuit 412, and data encoder 414 are each, for example, instantiated a plurality of times based on the number of slices. The elements 410, 412, 414 of each slice, for example, process a corresponding block of N bits of the data bus. The instances of the address encoder 410, for example, each operate on a corresponding fixed offset of the address representing the position of the N bits of data within the width of the data bus. Furthermore, in some embodiments, the granularity of a read or write access is lower than the width of the data bus, and, for example, corresponds to a byte, whereas the data bus has a width equal to a plurality of bytes. Thus the read or write operation may point to a specific starting byte across the width of the data bus.

To take a specific example, in one embodiment, M equal 2N, and N is equal to 8. There are, for example, 2 slices, meaning that the address encoder 410, the concatenation circuit 412 and data encoder 414 are each instantiated twice. The following table provides examples of the consecutive addresses provided by the address incrementer (ADDR INC) 408 and encoded by the first of the address encoders (ADDR ENC#1) 410 and by the second of the address encoders (ADDR ENC#2) in such an embodiment:

| ADDR INC 408 (output) | ADDR ENC#1 410 (input) | ADDR ENC#2 410 (input) |
|---|---|---|
| 0000 0110 | 0000 0110 | 0000 0111 |
| 0000 1000 | 0000 1000 | 0000 1001 |
| 0000 1010 | 0000 1010 | 0000 1011 |
| 0000 1100 | 0000 1100 | 0000 1101 |

Figure 5:
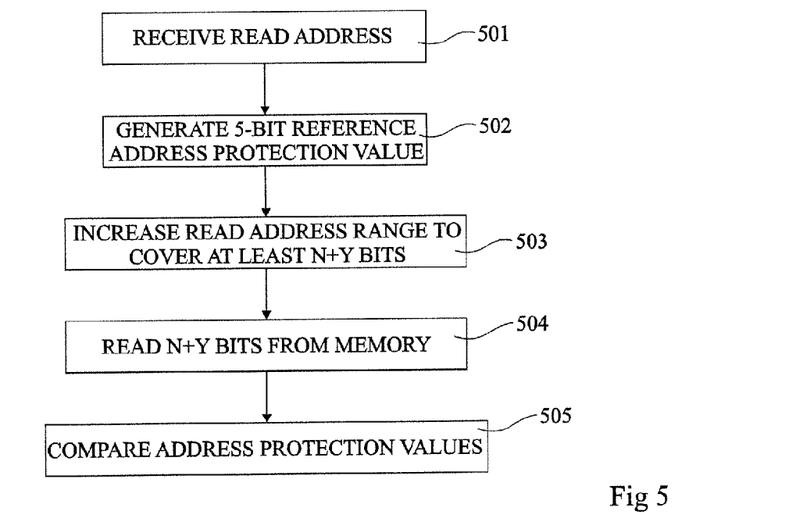
FIG. 5 is a flowchart illustrating a method of verifying address data, according to the present disclosure.

Referring to FIG. 5, an operation 501, a read address is received. In a subsequent operation 502, the read address is processed to generate a Y-bit reference address protection value. The same encoding algorithm is applied in operation 502 as the one applied in operation 302 of FIG. 3.

In a subsequent operation 503, the address range of the read access is increased to cover at least blocks of the N+Y bits. This involves the same modification as the one described in relation with operation 303 of FIG. 3, except that it is applied to a read address rather than a write address. In a subsequent operation 504, the memory access is performed, and the N+Y bits are read from the memory device. In a subsequent operation 505, the Y-bit address protection value read from the memory device is compared to the reference address protection value. If there is a match, it is, for example, considered that no address corruption occurred. If however there is not a match, an alert is, for example, generated, and the read data may be discarded.

Figure 6:
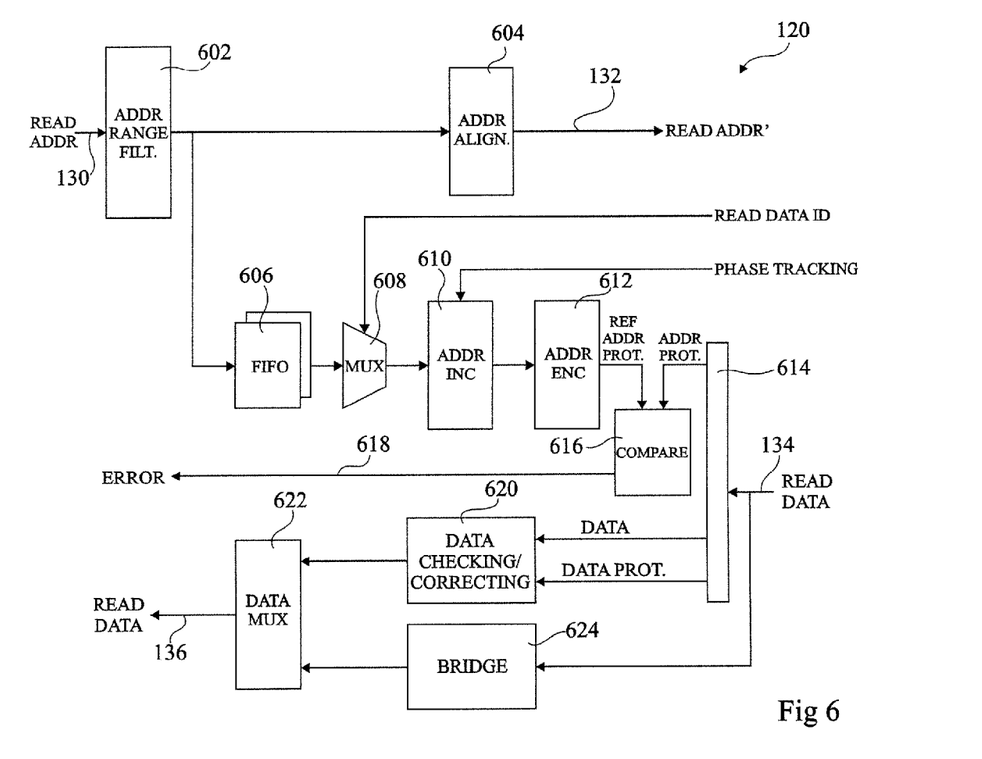
FIG. 6 is a schematic diagram of an address verification circuit of FIG. 1 in more detail.

Referring now to FIG. 6, the read address (READ ADDR) on the address path 130 is, for example, provided to an address range filter (ADDR RANGE FILT) 602, which is, for example, similar to the circuit 402 of FIG. 4. The output of the address range filter 602 is, for example, provided to an address alignment circuit (ADDR ALIGN) 604, which also, for example, operates in the same manner as the circuit 404 of FIG. 4, by increasing the address range of the read address to cover both system data and the corresponding address protection value. The circuit 604 provides the read address READ ADDR' on the output address bus 132.

The output of the address range filter 602 is also, for example, provided to a FIFO 606, which is coupled via a multiplexer (MUX) 608 to an address incrementer (ADDR INC) 610. The output of the address incrementer 610 is coupled to an address encoder (ADDR ENC) 612, which generates the reference address protection value (REF ADDR PROT) based on the read address. The address incrementer 610 and address encoder 612, for example, operate in a similar manner to the address incrementer 408 and the address encoder 410.

The multiplexer 608 is, for example, controlled by a signal READ DATA ID from the memory device 104, which, for example, indicates which read data is being provided on the bus 134, such that the multiplexer 608 selects the corresponding read address from the FIFO 606. The address incrementer 610, for example, receives one or more phase tracking signals (PHASE TRACKING), and is used to ensure that the addresses generated by the incrementer 610 corresponds to the read data present on the bus 134. In the case that the interface with the memory device is an AXI connection, the one or more phase tracking signals, for example, comprise signals RVALID, RREADY and RLAST, these signals being known to those skilled in the art.

The circuit 120 also comprises a splitter circuit 614, which receives, on the bus 134 from the memory device, the data read from the address READ ADDR', and extracts the address protection value. This address protection value (ADDR PROT) is provided to a comparator (COMPARE) 616, which also receives the reference address protection value from the address encoder 612. The comparator 616 compares the address protection value with the reference address protection value, and generates an error signal (ERROR) on an output line 618 of the comparator. If the address protection values match, the error signal is not activated. If however there is a discrepancy between values, the error signal is activated. In some embodiments, the line 618 is coupled to the processing device 116 performing the memory access, and the error signal indicates to the processing device 116 that the read data cannot be relied upon, in view of corruption to the address signal.

In some embodiments, a data checking/correcting circuit (DATA CHECKING/CORRECTING) 620 is also provided, which receives from the splitter circuit 614 the system data (DATA) extracted from the read data by the splitter 614, and also the X-bit data protection value (DATA PROT) extracted from the read data by the splitter 614. The output of the circuit 620 is, for example, coupled to a data multiplexer (DATA MUX) 622, which provides the read data on the output bus 136.

The multiplexer 622 also receives the read data from the input bus 134 via a bridge circuit (BRIDGE) 624, which allows the circuitry 614, 616 and 620 to be bypassed if the address of the read operation does not correspond to a protected address range. The bridge circuit 624, for example, converts 2N bits of read data provided on a single memory access cycle into N bits of read data over two memory access cycles. For example, on a first cycle, the 2N bits of read data from the bus 134 are stored by the bridge 624 and output on the bus 136 over two cycles. The multiplexer 622 is, for example, adapted to select the path with the bridge 624 if the read operation concerns an address range which does not have added address and data protection.

In some embodiments, the slicing may be implemented in the address verification circuit 120 in a similar fashion to what is described above in relation to FIG. 4. In the embodiment of FIG. 6, the elements 612, 614, 616 and 620 are, for example, duplicated such that each instantiation of these elements processes a corresponding N-bit block.

An advantage of the embodiments described herein is that address protection may be provided in a relatively simple manner, while maintaining a standard interface with the memory device. Indeed, the only modification is, for example, to increase the width of the data bus to the memory device, for example, by doubling its width. Having thus described at least one illustrative embodiment, various alterations, modifications and improvements will readily occur to those skilled in the art. In particular, while examples have been described in which the sum of the X bits of the data protection value and Y bits of the address protection value is equal to the number N of bits of the system data, many other formats would be possible. For example, it would be possible for X+Y to equal N/2 or N/4.

That which is claimed is:

1. A circuit for protecting memory address data, the circuit comprising:
   an input data bus configured to receive write data to be written to a memory device;
   an input address bus configured to receive a write address associated with the write data;
   an output data bus; and
   an address protection circuit coupled to said input data, input address, and output data buses and configured to
      generate an address protection value based on the write address,
      generate modified write data, on said output data bus, the modified write data including both the write data and the address protection value, said output data bus having a width greater than a width of said input data bus, and
      generate a modified write address.

2. The circuit of claim 1 wherein said address protection circuit is configured to generate a data protection value based on the write data, the modified write data comprising the data protection value.

3. The circuit of claim 1 further comprising an output address bus coupled to said address protection circuit and the memory device, wherein said address protection circuit comprises an address generation circuit configured to generate the modified write address on said output address bus.

4. The circuit of claim 3 wherein said address generation circuit is configured to generate the modified write address by shifting the write address by one bit.

5. The circuit of claim 1 wherein a number of bits of the write data is less than the width of said input data bus; and wherein the address protection value is generated based on a sub-address corresponding to a position of the bits of write data within a width of said input address bus.

6. The circuit of claim 5 wherein the width of said input data bus is equal to a multiple of the number of bits of the write data; and wherein said address protection circuit comprises a plurality of address encoders, each address encoder configured to generate the address protection value based on a corresponding one of sub-addresses.

7. The circuit of claim 1 wherein said address protection circuit comprises a protection data generation circuit configured to generate the address protection value by encoding the write address to generate a Y-bit value; and wherein Y is less than a number of bits of the write address.

8. The circuit of claim 7 wherein said address protection circuit comprises an address range filtering circuit configured to determine whether the write address is in an address range to be protected; and wherein the address protection value is generated only if the write address is in the address range to be protected.

9. The circuit of claim 8 wherein said address protection circuit comprises a bypass path configured to provide the write data directly to said output data bus if the write address is not in the address range to be protected, said bypass path comprising a bridge circuit configured to convert N bits of the write data into at least N+Y bits of write data.

10. A circuit for verifying memory address data, the circuit comprising:
    an input address bus configured to receive a read address;
    an output address bus;
    an address verification circuit coupled to said input address and output address buses, and configured to
       generate a reference address protection value based on the read address, and
       generate a modified read address on said output address bus; and
    a read data input bus coupled to said address verification circuit and configured to
       receive read data and an address protection value from a memory device, said address verification circuit being configured to verify the read address by comparing the address protection value from the memory device with the reference address protection value.

11. The circuit of claim 10 wherein a number of bits of the read data is less than a width of a read data portion of said read data input bus; and wherein the reference address protection value is generated based on a sub-address corresponding to a position of the read data within the width of the read data portion of said read data input bus.

12. The circuit of claim 11 wherein the width of the read data portion of said read data input bus is equal to a multiple of the number of bits of the read data, said address verification circuit comprising a plurality of address encoders, each address encoder configured to generate the address protection value based on a corresponding one of sub-addresses.

13. An address circuit comprising:
    a write protection circuit comprising
       an input data bus configured to receive write data to be written to a memory device,
       an input address bus configured to receive a write address associated with the write data,
       an output data bus, and
       an address protection circuit coupled to said input data, input address, and output data buses and configured to
          generate a first address protection value based on the write address,
          generate modified write data, on said output data bus, the modified write data comprising the write data and the first address protection value, said output data bus having a width greater than a width of said input data bus, and
          generate a modified write address; and
    a read protection circuit comprising
       an input address bus configured to receive a read address,
       an address verification circuit coupled to said input address bus and configured to generate a reference address protection value based on the read address, and
       a read data input bus coupled to said address verification circuit and configured to receive read data and a second address protection value from the memory device, said address verification circuit configured to verify the read address by comparing the second address protection value from the memory device with the reference address protection value.

14. The address circuit of claim 13 wherein said address protection circuit is configured to generate a data protection value based on the write data, the modified write data comprising the data protection value.

15. The address circuit of claim 13 wherein said write protection circuit comprises an output address bus coupled to said address protection circuit and the memory device, and wherein said address protection circuit comprises an address generation circuit configured to generate the modified write address on said output address bus.

16. The address circuit of claim 15 wherein said address generation circuit is configured to generate the modified write address by shifting the write address by one bit.

17. A method of protecting memory address data comprising:
  receiving, via an input data bus, write data to be written to a memory device;
  receiving, via an input address bus, a write address associated with the write data;
  generating, via an address protection circuit,
    an address protection value based on the write address, and
    modified write data, on an output data bus, the modified write data comprising the write data and the address protection value, the output data bus having a width greater than a width of the input data bus; and
  generating, via the address protection circuit, a modified write address.

18. The method of claim 17 further comprising generating, via the address protection circuit, a data protection value based on the write data, the modified write data comprising the data protection value.

19. The method of claim 17 wherein generating the modified write address comprises generating the modified write address on an output address bus using an address generation circuit of the address protection circuit.

20. The method of claim 19 further comprising generating, via the address protection circuit, the modified write address by shifting the write address by one bit.

21. A method of verifying memory address data comprising:
  receiving, via an input address bus, a read address;
  generating, via an address verification circuit, a reference address protection value based on the read address;
  generating, via the address verification circuit, a modified read address on an output address bus;
  receiving, via a read data input bus coupled to the address verification circuit, read data and an address protection value from a memory device; and
  verifying, via the address verification circuit, the read address by comparing the address protection value from the memory device with the reference address protection value.

22. The method of claim 21 wherein a number of bits of the read data is less than a width of a read data portion of the read data input bus; and wherein the reference address protection value is generated based on a sub-address corresponding to a position of the read data within the width of the read data portion of the read data input bus.

23. The method of claim 22 wherein the width of the read data portion of the read data input bus is equal to a multiple of the number of bits of the read data, the address verification circuit comprising a plurality of address encoders, each address encoder configured to generate the address protection value based on a corresponding one of sub-addresses.

* * * * *